United States Patent

Sapru et al.

[11] Patent Number: 5,916,381
[45] Date of Patent: Jun. 29, 1999

[54] MAGNESIUM MECHANICAL ALLOYS FOR THERMAL HYDROGEN STORAGE

[75] Inventors: Krishna Sapru, Troy; Lu Ming, Rochester Hills; Subramanian Ramachandran, Sterling Heights, all of Mich.

[73] Assignee: Energy Conversion Devices, Inc., Troy, Mich.

[21] Appl. No.: 08/730,274

[22] Filed: Oct. 15, 1996

Related U.S. Application Data

[63] Continuation of application No. 08/363,205, Dec. 22, 1994, abandoned.

[51] Int. Cl.[6] ................................................. C22C 24/00
[52] U.S. Cl. ........................ 148/403; 148/420; 420/402; 420/900
[58] Field of Search .................... 148/403, 406, 148/420; 420/402, 900

[56] References Cited

U.S. PATENT DOCUMENTS

| | | | |
|---|---|---|---|
| 4,431,561 | 2/1984 | Ovshinsky et al. | 420/402 |
| 4,728,580 | 3/1988 | Grasselli et al. | 420/900 |
| 4,902,579 | 2/1990 | Grasselli et al. | 420/900 |

FOREIGN PATENT DOCUMENTS

| | | | |
|---|---|---|---|
| 56-37202 | 4/1981 | Japan | 420/900 |
| 2-47238 | 2/1990 | Japan . | |

*Primary Examiner*—George Wyszomierski
*Attorney, Agent, or Firm*—David W. Schumaker; Marvin S. Siskind; Marc J. Luddy

[57] ABSTRACT

Mechanically alloyed hydrogen storage materials having a major atomic percentage of magnesium and a minor atomic percentage of at least two elements selected from the group consisting of nickel, molybdenum, iron and titanium. Preferably the mechanical alloy comprises a multi-phase material, including at least one amorphous phase. Also, the at least two elements are preferably either nickel (from about 5 to 15 at. %) and molybdenum (from about 0.5 to 5 at. %) or iron (from about 5 to 15 at. %) and titanium (from about 5 to 15 at. %). The hydrogen storage materials are created by mechanical alloying in a milling apparatus under an inert atmosphere, such as argon, or a mixed atmosphere, such as argon and hydrogen. The speed and length of the milling are varied.

9 Claims, 17 Drawing Sheets

MAGNESIUM MECHANICAL ALLOYS FOR THERMAL HYDROGEN STORAGE

This is a Continuation of application Ser. No. 08/363,205 filed Dec. 22, 1994, now abandoned.

FIELD OF THE INVENTION

The present invention relates to mechanical alloys for hydrogen storage and more specifically to magnesium mechanical alloys for hydrogen storage. Most specifically, the present invention relates to ternary magnesium mechanical alloys of the Mg—Ni—Mo and Mg—Fe—Ti systems and their use as hydrogen storage materials.

BACKGROUND OF THE INVENTION

Growing energy needs have prompted specialists to take cognizance of the fact that the traditional energy resources, such as coal, petroleum or natural gas, are not inexhaustible, or at least that they are becoming costlier all the time, and that it is advisable to consider replacing them gradually with other energy sources, such as nuclear energy, solar energy, or geothermal energy. Hydrogen, too, is coming into use as an energy source.

Hydrogen may be used, for example, as fuel for internal-combustion engines in place of hydrocarbons. In this case it has the advantage of eliminating atmospheric pollution through the formation of oxides of carbon or of sulfur upon combustion of the hydrocarbons. Hydrogen may also be used to fuel hydrogen-air fuel cells for production of the electricity needed for electric motors.

One of the problems posed by the use of hydrogen is its storage and transportation. A number of solutions have been proposed:

Hydrogen may be stored under high pressure in steel cylinders, but this approach has the drawback of requiring hazardous and heavy containers which are difficult to handle (in addition to having a low storage capacity of about 1% by weight). Hydrogen may also be stored in cryogenic containers, but this entails the disadvantages associated with the use of cryogenic liquids; such as, for example, the high cost of the containers, which also require careful handling. There are also "boil off" losses of about 2–5% per day.

Another method of storing hydrogen is to store it in the form of a hydride, which then is decomposed at the proper time to furnish hydrogen. The hydrides of iron-titanium, lanthanum-nickel, vanadium, and magnesium have been used in this manner, as described in French Pat. No. 1,529,371.

The $MgH_2$—Mg system is the most appropriate of all known metal-hydride and metal systems that can be used as reversible hydrogen-storage systems because it has the highest percentage by weight (7.65% by weight) of theoretical capacity for hydrogen storage and hence the highest theoretical energy density (2332 Wh/kg; Reilly & Sandrock, Spektrum der Wissenschaft, April 1980, 53) per unit of storage material.

Although this property and the relatively low price of magnesium make the $MgH_2$—Mg seem the optimum hydrogen storage system for transportation, for hydrogen-powered vehicles that is, its unsatisfactory kinetics have prevented it from being used up to the present time. It is known for instance that pure magnesium can be hydrided only under drastic conditions, and then only very slowly and incompletely. The dehydriding rate of the resulting hydride is also unacceptable for a hydrogen storage material (Genossar & Rudman, Z. f. Phys. Chem., Neue Folge 116, 215 [1979], and the literature cited therein).

Moreover, the hydrogen storage capacity of a magnesium reserve diminishes during the decomposition-reconstitution cycles. This phenomenon may be explained by a progressive poisoning of the surface, which during the reconstitution renders the magnesium atoms located in the interior of the reserve inaccessible to the hydrogen.

To expel the hydrogen in conventional magnesium or magnesium/nickel reserve systems, temperatures of more than 250° C. are required, with a large supply of energy at the same time. The high temperature level and the high energy requirement for expelling the hydrogen have the effect that, for example, a motor vehicle with an internal combustion engine, cannot exclusively be operated from these stores. This occurs because the energy contained in the exhaust gas, in the most favorable case (full load), is sufficient for meeting 50% of the hydrogen requirement of the internal combustion engine from a magnesium or magnesium/nickel store. Thus, the remaining hydrogen demand must be taken from a hydride store. For example, this store can be titanium/iron hydride (a typical low-temperature hydride store) which can be operated at temperatures down to below 0° C. These low-temperature hydride stores have the disadvantage of only having a low hydrogen storage capacity.

Storage materials have been developed in the past, which have a relatively high storage capacity but from which hydrogen is nevertheless expelled at temperatures of up to about 250° C. U.S. Pat. No. 4,160,014 describes a hydrogen storage material of the formula $Ti_{[1-x]}Zr_{[x]}Mn_{[2-y-z]}Cr_{[y]}V_{[z]}$, wherein x=0.05 to 0.4, y=0 to 1 and z=0 to 0.4. Up to about 2% by weight of hydrogen can be stored in such an alloy. In addition to this relatively low storage capacity, these alloys also have the disadvantage that the price of the alloy is very high when metallic vanadium is used.

Moreover, U.S. Pat. No. 4,111,689 has disclosed a storage alloy which comprises 31 to 46% by weight of titanium, 5 to 33% by weight of vanadium and 36 to 53% by weight of iron and/or manganese. Although alloys of this type have a greater storage capacity for hydrogen than the alloy according to U.S. Pat. No. 4,160,014, hereby incorporated by reference, they have the disadvantage that temperatures of at least 250° C. are necessary in order to completely expel the hydrogen. At temperatures of up to about 100° C., about 80% of the hydrogen content can be discharged in the best case. However, a high discharge capacity, particularly at low temperatures, is frequently necessary in industry because the heat required for liberating the hydrogen from the hydride stores is often available only at a low temperature level.

In contrast to other metals or metal alloys, especially such metal alloys which contain titanium or lanthanum, magnesium is preferred for the storage of hydrogen not only because of its lower material costs, but above all, because of its lower specific weight as a storage material. However, the hydriding

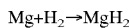

$$Mg + H_2 \rightarrow MgH_2$$

is, in general, more difficult to achieve with magnesium, inasmuch as the surface of the magnesium will rapidly oxidize in air so as to form stable MgO and/or $Mg(OH)_2$ surface layers. These layers inhibit the dissociation of hydrogen molecules, as well as the absorption of produced hydrogen atoms and their diffusion from the surface of the granulate particles into the magnesium storage mass.

Intensive efforts have been devoted in recent years to improve the hydriding ability of magnesium by doping or alloying it with such individual foreign metals as aluminum (Douglass, Metall. Trans. 6a, 2179 [1975]) indium (Mintz, Gavra, & Hadari, J. Inorg. Nucl. Chem. 40, 765 [1978]), or iron (Welter & Rudman, Scripta Metallurgica 16, 285 [1982]), with various foreign metals (German Offenlegungsschriften 2 846 672 and 2 846 673), or with intermetallic compounds like $Mg_2Ni$ or $Mg_2Cu$ (Wiswall, Top Appl. Phys. 29, 201 [1978] and Genossar & Rudman, op. cit.) and LaNi5 (Tanguy et al., Mater. Res. Bull. 11, 1441 [1976]).

Although these attempts did improve the kinetics somewhat, certain essential disadvantages have not yet been eliminated from the resulting systems. The preliminary hydriding of magnesium doped with a foreign metal or intermetallic compound still demands drastic reaction conditions, and the system kinetics will be satisfactory and the reversible hydrogen content high only after many cycles of hydriding and dehydriding. Considerable percentages of foreign metal or of expensive intermetallic compound are also necessary to improve kinetic properties. Furthermore, the storage capacity of such systems are generally far below what would theoretically be expected for $MgH_2$.

It is known that the storage quality of magnesium and magnesium alloys can also be enhanced by the addition of materials which may help to break up stable oxides of magnesium. For example, such an alloy is $Mg_2Ni$, in which the Ni appears to form unstable oxides. In this alloy, thermodynamic examinations indicated that the surface reaction $Mg_2Ni+O_2 \rightarrow 2MgO+Ni$ extended over nickel metal inclusions which catalyze the hydrogen dissociation-absorption reaction. Reference may be had to A. Seiler et al., Journal of Less-Common Metals 73, 1980, pages 193 et seq.

One possibility for the catalysis of the hydrogen dissociation-absorption reaction on the surface of magnesium lies also in the formation of a two-phase alloy, wherein the one phase is a hydride former, and the other phase is a catalyst. Thus, it is known to employ galvanically-nickeled magnesium as a hydrogen storage, referring to F. G. Eisenberg et al. Journal of Less-Common Metals 74, 1980, pages 323 et seq. However, there were encountered problems during the adhesion and the distribution of the nickel over the magnesium surface.

In order to obtain an extremely dense and good adherent catalyst phase under the formation alone of equilibrium phases, it is also known that for the storage of hydrogen there can be employed an eutectic mixture of magnesium as a hydride-forming phase in conjunction with magnesium copper ($Mg_2Cu$), referring to J. Genossar et al., Zeitschrift fur Physikalische Chemie Neue Folge 116, 1979, pages 215 et seq. The storage capacity per volume of work material which is achieved through this magnesium-containing granulate does not, however, meet any high demands because of the quantity of magnesium copper which is required for the eutectic mixture.

The scientists of this era looked at various materials and postulated that a particular crystalline structure is required for hydrogen storage, see, for example, "Hydrogen Storage in Metal Hydride", Scientific American, Vol. 242, No. 2, pp. 118–129, February, 1980. It was found that it is possible to overcome many of the disadvantages of the prior art materials by utilizing a different class of materials, disordered hydrogen storage materials. For example, U.S. Pat. No. 4,265,720 to Guenter Winstel for "Storage Materials for Hydrogen" describes a hydrogen storage body of amorphous or finely crystalline silicon. The silicon is preferably a thin film in combination with a suitable catalyst and on a substrate.

Laid-open Japanese Patent Application No. 55-167401, "Hydrogen Storage Material," in the name of Matsumato et al, discloses bi or tri-element hydrogen storage materials of at least 50 volume percent amorphous structure. The first element is chosen from the group Ca, Mg, Ti, Zr, Hf, V, Nb, Ta, Y and lanthanides, and the second from the group Al, Cr, Fe, Co, Ni, Cu, Mn and Si. A third element from the group B, C, P and Ge can optionally be present. According to the teaching of No. 55-167401, the amorphous structure is needed to overcome the problem of the unfavorably high desorption temperature characteristic of most crystalline systems. A high desorption temperature (above, for example, 150° C.) severely limits the uses to which the system may be put.

According to Matsumoto et al, the material of at least 50% amorphous structure will be able to desorb at least some hydrogen at relatively low temperatures because the bonding energies of the individual atoms are not uniform, as is the case with crystalline material, but are distributed over a wide range.

Matsumoto et al claims a material of at least 50% amorphous structure. While Matsumoto et al does not provide any further teaching about the meaning of the term "amorphous," the scientifically accepted definition of the term encompasses a maximum short range order of about 20 Angstroms or less.

The use by Matsumato et al of amorphous structure materials to achieve better desorption kinetics due to the non-flat hysteresis curve is an inadequate and partial solution. The other problems found in crystalline hydrogen storage materials, particularly low useful hydrogen storage capacity at moderate temperature, remain.

However, even better hydrogen storage results, i.e., long cycle life, good physical strength, low absorption/desorption temperatures and pressures, reversibility, and resistance to chemical poisoning, may be realized if full advantage is taken of modification of disordered metastable hydrogen storage materials. Modification of disordered structurally metastable hydrogen storage materials is described in U.S. Pat. No. 4,431,561 to Stanford R. Ovshinsky et al. for "Hydrogen Storage Materials and Method of Making the Same". As described therein, disordered hydrogen storage materials, characterized by a chemically modified, thermodynamically metastable structure, can be tailor-made to possess all the hydrogen storage characteristics desirable for a wide range of commercial applications. The modified hydrogen storage material can be made to have greater hydrogen storage capacity than do the single phase crystalline host materials. The bonding strengths between the hydrogen and the storage sites in these modified materials can be tailored to provide a spectrum of bonding possibilities thereby to obtain desired absorption and desorption characteristics. Disordered hydrogen storage materials having a chemically modified, thermodynamically metastable structure also have a greatly increased density of catalytically active sites for improved hydrogen storage kinetics and increased resistance to poisoning.

The synergistic combination of selected modifiers incorporated in a selected host matrix provides a degree and quality of structural and chemical modification that stabilizes chemical, physical, and electronic structures and conformations amenable to hydrogen storage.

The framework for the modified hydrogen storage materials is a lightweight host matrix. The host matrix is structurally modified with selected modifier elements to provide a disordered material with local chemical environments which result in the required hydrogen storage properties.

Another advantage of the host matrix described by Ovshinsky, et al. is that it can be modified in a substantially continuous range of varying percentages of modifier elements. This ability allows the host matrix to be manipulated by modifiers to tailor-make or engineer hydrogen storage materials with characteristics suitable for particular applications. This is in contrast to multi-component single phase host crystalline materials which generally have a very limited range of stoichiometry available. A continuous range of control of chemical and structural modification of the thermodynamics and kinetics of such crystalline materials therefore is not possible.

A still further advantage of these disordered hydrogen storage materials is that they are much more resistant to poisoning. As stated before, these materials have a much greater density of catalytically active sites. Thus, a certain number of such sites can be sacrificed to the effects of poisonous species, while the large number of non-poisoned active sites still remain to continue to provide the desired hydrogen storage kinetics.

Another advantage of these disordered materials is that they can be designed to be mechanically more flexible than single phase crystalline materials. The disordered materials are thus capable of more distortion during expansion and contraction allowing for greater mechanical stability during the absorption and desorption cycles.

One drawback to these disordered materials is that, in the past, some of the Mg based alloys have been difficult to produce. Particularly those materials that did not form solutions in the melt. Also, the most promising materials (i.e. magnesium based materials) were extremely difficult to make in bulk form. That is, while thin-film sputtering techniques could make small quantities of these disordered alloys, there was no bulk preparation technique.

Then in the mid 1980's, two groups developed mechanical alloying techniques to produce bulk disordered magnesium alloy hydrogen storage materials. Mechanical alloying was found to facilitate the alloying of elements with vastly different vapor pressures and melting points (such as Mg with Fe or Ti etc.), especially when no stable intermetallic phases exist. Conventional techniques like induction melting have been found to be inadequate for such purposes.

The first of the two groups was a team of French scientists which investigated mechanical alloying of materials of the Mg—Ni system and their hydrogen storage properties. See Senegas, et al., "Phase Characterization and Hydrogen Diffusion Study in the Mg—Ni—H System", Journal of the Less-Common Metals, Vol. 129, 1987, pp. 317–326 (binary mechanical alloys of Mg and Ni incorporating 0, 10, 25 and 55 wt. % Ni); and also, Song, et al. "Hydriding and Dehydriding Characteristics of Mechanically Alloyed Mixtures Mg-$x$wt. % Ni (x=5, 10, 25 and 55)", Journal of the Less-Common Metals, Vol. 131, 1987, pp. 71–79 (binary mechanical alloys of Mg and Ni incorporating 5, 10, 25 and 55 wt. % Ni).

The second of the two groups was a team of Russian scientists which investigated the hydrogen storage properties of binary mechanical alloys of magnesium and other metals. See Ivanov, et al., "Mechanical Alloys of Magnesium—New Materials For Hydrogen Energy", Doklady Physical Chemistry (English Translation) vol. 286:1–3, 1986, pp. 55–57, (binary mechanical alloys of Mg with Ni, Ce, Nb, Ti, Fe, Co, Si and C); also, Ivanov, et al. "Magnesium Mechanical Alloys for Hydrogen Storage", Journal of the Less-Common Metals, vol. 131, 1987, pp.25–29 (binary mechanical alloys of Mg with Ni, Fe, Co, Nb and Ti); and Stepanov, et al., "Hydriding Properties of Mechanical Alloys of Mg—Ni", Journal of the Less-Common Metals, vol. 131, 1987, pp.89–97 (binary mechanical alloys of the Mg—Ni system). See also the collaborative work between the French and Russian groups, Konstanchuk, et al., "The Hydriding Properties of a Mechanical Alloy With Composition Mg-25% Fe", Journal of the Less-Common Metals, vol. 131, 1987, pp.181–189 (binary mechanical alloy of Mg and 25 wt. % Fe).

Later, in the late 1980's and early 1990's, a Bulgarian group of scientists (sometimes in collaboration with the Russian group of scientists) investigated the hydrogen storage properties of mechanical alloys of magnesium and metal oxides. See Khrussanova, et al., "Hydriding Kinetics of Mixtures Containing Some 3d-Transition Metal Oxides and Magnesium", Zeitschrift fur Physikalische Chemie Neue Folge, München, vol. 164, 1989, pp.1261–1266 (comparing binary mixtures and mechanical alloys of Mg with $TiO_2$, $V_2O_5$, and $Cr_2O_3$); and Peshev, et al., "Surface Composition of Mg—$TiO_2$ Mixtures for Hydrogen Storage, Prepared by Different Methods", Materials Research Bulletin, vol. 24, 1989, pp.207–212 (comparing conventional mixtures and mechanical alloys of Mg and $TiO_2$). See also, Khrussanova, et al., "On the Hydriding of a Mechanically Alloyed Mg(90%)—$V_2O_5$(10%) Mixture", International Journal of Hydrogen Energy, vol. 15, No. 11, 1990, pp.799–805 (investigating the hydrogen storage properties of a binary mechanical alloy of Mg and $V_2O_5$); and Khrussanova, et al., "Hydriding of Mechanically Alloyed Mixtures of Magnesium With $MnO_2$, $Fe_2O_3$, and NiO", Materials Research Bulletin, vol. 26, 1991, pp. 561–567 (investigating the hydrogen storage properties of a binary mechanical alloys of Mg with and $MnO_2$, $Fe_2O_3$, and NiO). Finally, see also, Khrussanova, et al., "The Effect of the d-Electron Concentration on the Absorption Capacity of Some Systems for Hydrogen Storage", Materials Research Bulletin, vol. 26, 1991, pp. 1291–1298 (investigating d-electron concentration effects on the hydrogen storage properties of materials, including mechanical alloys of Mg and 3-d metal oxides); and Mitov, et al., "A Mössbauer Study of a Hydrided Mechanically Alloyed Mixture of Magnesium and Iron(III) Oxide", Materials Research Bulletin, vol. 27, 1992, pp. 905–910 (Investigating the hydrogen storage properties of a binary mechanical alloy of Mg and $Fe_2O_3$).

Most recently, a group of Chinese scientists have investigated the hydrogen storage properties of some mechanical alloys of Mg with other metals. See, Yang, et al., "The Thermal Stability of Amorphous Hydride $Mg_{50}Ni_{50}H_{54}$ and $Mg_{30}Ni_{70}H_{45}$", Zeitschrift für Physikalische Chemie, München, vol. 183, 1994, pp. 141–147 (Investigating the hydrogen storage properties of the mechanical alloys $Mg_{50}Ni_{50}$ and $Mg_{30}Ni_{70}$); and Lei, et al., "Electrochemical Behavior of Some Mechanically Alloyed Mg—Ni-based Amorphous Hydrogen Storage Alloys", Zeitschrift für Physikalische Chemie, München, vol. 183, 1994, pp. 379–384 (investigating the electrochemical [i.e. Ni—MH battery] properties of some mechanical alloys of Mg—Ni with Co, Si, Al, and Co—Si).

The present inventors have continued the investigation of mechanical alloys of Mg with other metals for use as hydrogen storage materials and have achieved outstanding results with the magnesium mechanical alloys disclosed herein.

SUMMARY OF THE INVENTION

The instant invention discloses mechanically alloyed hydrogen storage materials having a major atomic percentage of magnesium and a minor atomic percentage of at least two elements selected from the group consisting of nickel, molybdenum, iron and titanium. Preferably the mechanical alloy comprises a multi-phase material, including at least one amorphous phase. Also, preferably the at least two elements are nickel and molybdenum or iron and titanium.

When the additional elements are nickel and molybdenum it is preferable that the magnesium comprises from 80 to 95 at. % of the mechanical alloy, the nickel comprises from 5 to 15 at. % of the mechanical alloy and the molybdenum comprises from 0.5 to 5 at. % of the mechanical alloy.

When the additional elements are iron and titanium it is preferable that the magnesium comprises from 75 to 95 at. % of the mechanical alloy, the iron comprises from 5 to 15 at. % of the mechanical alloy, and the titanium comprises from 5 to 15 at. % of the mechanical alloy.

The hydrogen storage materials were created by mechanical alloying in a ball milling apparatus under an inert atmosphere such as argon. The speed and length of the milling are varied.

DETAILED DESCRIPTION OF THE INVENTION

Figure 1:
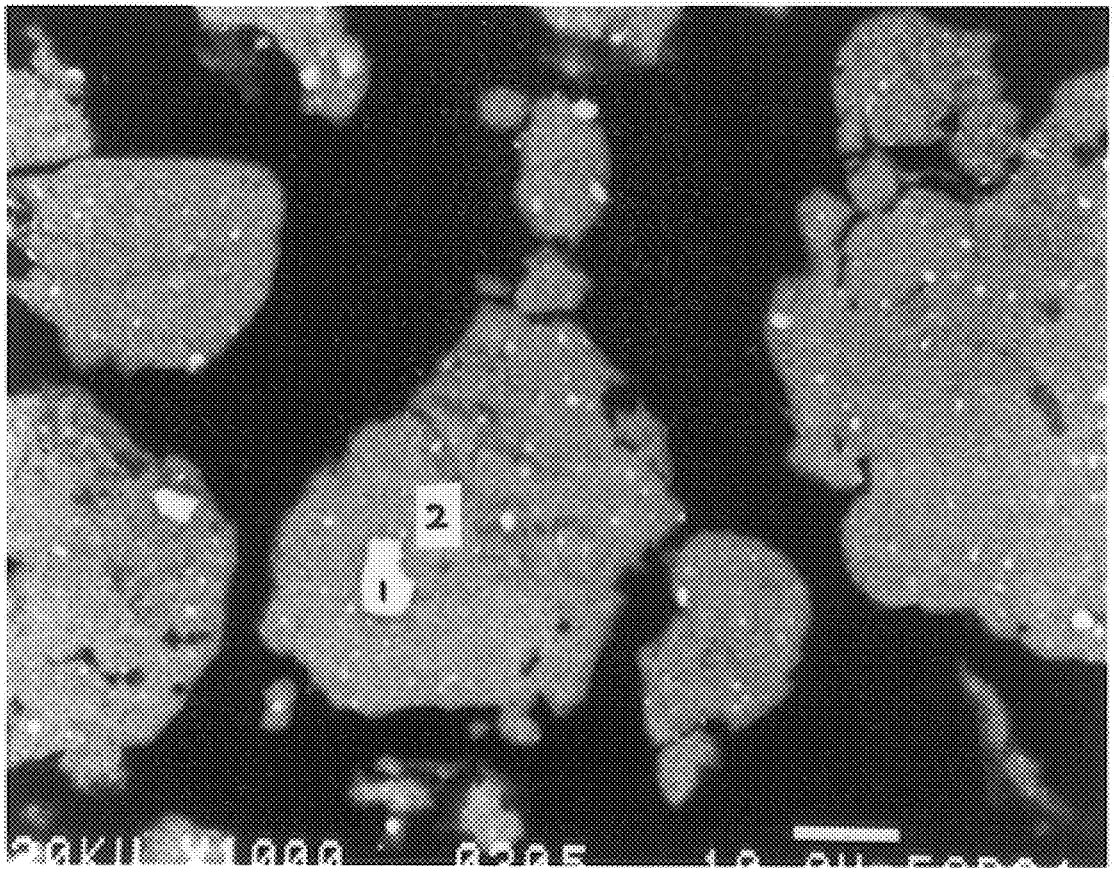
FIG. 1 is an SEM photomicrograph of the as prepared sample MA-2, which was prepared by grinding Mg and Ni—Mo in an attritor mill at 300 RPM for 72 hr.

The instant inventors have discovered certain new hydrogen storage materials primarily for use in thermal hydrogen storage applications.

The particular materials developed are mechanical alloys which include a majority atomic percentage of magnesium and also include at least two elements selected from the group consisting of nickel, molybdenum, iron and titanium. Particularly useful combinations of these metals are the Mg—Ni—Mo and Mg—Fe—Ti systems.

The hydrogen storage materials are made by a mechanical alloy process. The starting materials for the Mg—Ni—Mo system were pure Mg granules (>99.9% pure, −20+100 mesh) and a Ni—Mo binary alloy powder (85 wt. % Ni, −325 mesh) or individual Ni and Mo powders or an FeTi binary alloy (50 at. %, −325 mesh). The starting materials were ground in a ball milling apparatus for varied times at different speeds under an argon atmosphere.

While many such processes exist the present inventors have used two such processes. One process uses high energy ball milling where the attrition is carried out in a stainless steel jar with 3/16 inch stainless steel balls (medium) under argon atmosphere. The mass ratio of the medium to the charge to be alloyed was about 100:1. Typically 4 lbs. of medium is used in a jar of volume 750 cc.

The second method involved the use of a planetary ball mill. Unlike the attritor in which the jar is stationary, in the planetary ball mill the jars rotate on a horizontal plane about their own central axis. Preliminary experiments indicate that to alloy samples that are brittle and in the form of large chunks (5–10 mm in size), it is preferable to use tungsten carbide grinding media of about 3 mm in diameter. When the starting material is of smaller particle size (0.01 mm or less), stainless steel grinding media of about 3/16 inch or less works better.

The mechanically alloyed samples do not need any crushing since the final product is in powder form. However, in order to eliminate the effects due to particle size the materials were put through a sieve to obtain particles of fairly uniform size.

For activation, the samples were typically exposed to hydrogen gas at 600–800 psi at temperatures between 350° C. and 380° C. overnight after the reactor had been evacuated to $10^{-3}$ Torr. To completely activate samples, they were subjected to at least three absorption/desorption cycles.

Hydrogen storage capacity, hydriding and dehydriding kinetics and pressure-composition isotherms were determined by combinations of volumetric and manometric methods. The pressure change versus time during hydriding and dehydriding process was dynamically read using a computer.

A poisoning study was done to determine the effects of a trace amount of impurities such as CO, and $CH_4$ in the hydrogen on hydrogen storage properties of the alloy. After testing the samples under normal conditions, they were exposed to the hydrogen/poison mixture for 24 hours and then re-tested for desorption kinetics. To determine if the samples could be reactivated, they were then subjected to pure hydrogen and cycled five times before measuring the desorption kinetics once again.

Phase analysis in a scanning electron microscope (SEM) was performed on a mounted and polished sample to minimize the effect of topography. The sample was photographed in secondary electron image (SEI) mode which shows primarily topography, and backscattered electron image (BEI) mode which shows contrast by atomic number. In BEI higher atomic number areas appear lighter than lower atomic number areas. After identifying the different composition regions, a spot chemical analysis is performed by energy dispersive X-ray spectroscopy (EDS). All EDS results were analyzed with pure elemental standards. X-ray diffraction was done for structural determination.

Table 1 summarizes the experimental conditions used to produce some example alloys in the Mg—Ni—Mo and Mg—Fe—Ti systems, as well as their nominal composition, and the maximum hydrogen storage capacity obtained therefrom. The samples, prepared by mechanically alloying, are typically multi-phase with at least one major amorphous phase as revealed by XRD study.

FIG. 1 is an SEM photomicrograph which shows the morphological features of sample MA-2 in Table 1. SEM analysis indicates that there are three phases, all of which contain Mg, Ni, and Mo. All samples show that alloying has taken place and that the major phases in each case contain all alloying elements. Analysis of the mechanical alloys indicate that some impurities (such as iron, chromium, silicon, tungsten etc.) become incorporated into the alloys from the grinding media (i.e. stainless steel balls, WC balls etc.).

Figure 2:
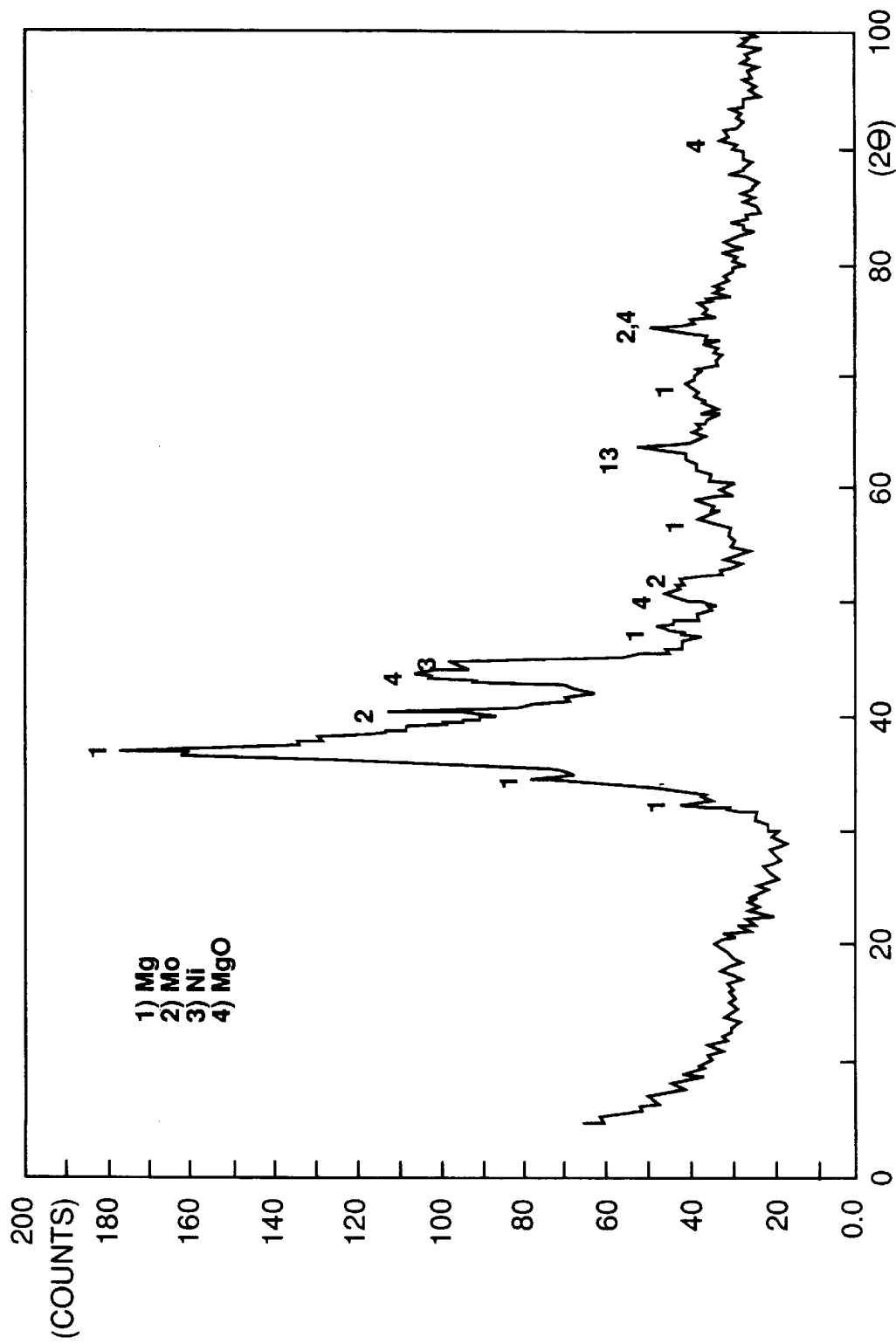
FIG. 2 is an X-ray diffraction pattern of the as-prepared sample MA-2.

FIG. 2 is a graphical depiction of the X-ray diffraction pattern of the MA-2 sample. All as-prepared samples show broad X-ray diffraction peaks, indicative of amorphous structural phases.

Figure 3:
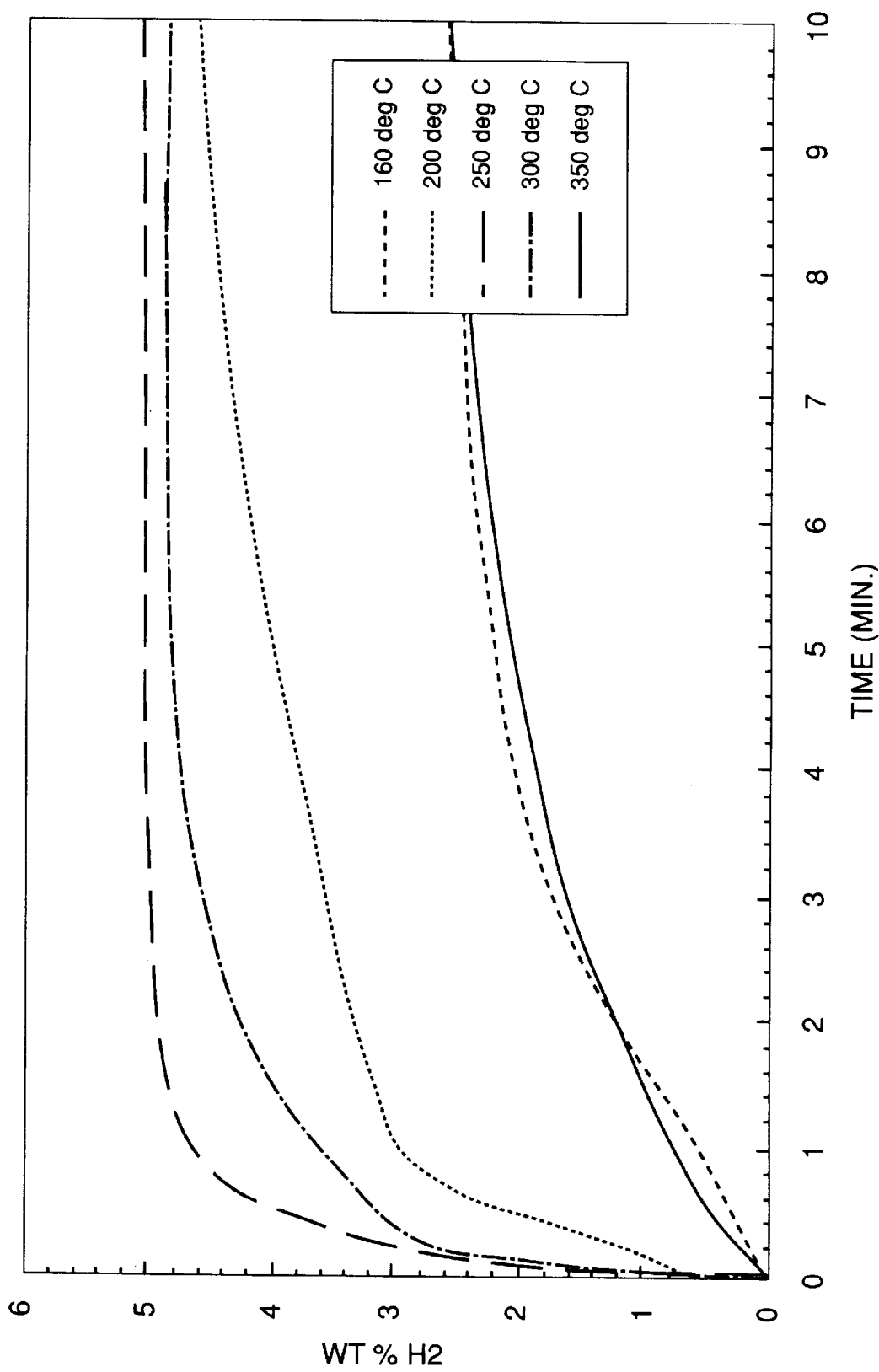
FIG. 3 is a plot of the hydriding kinetics of sample MA-2 under 50 psig at various temperatures.
Figure 4:
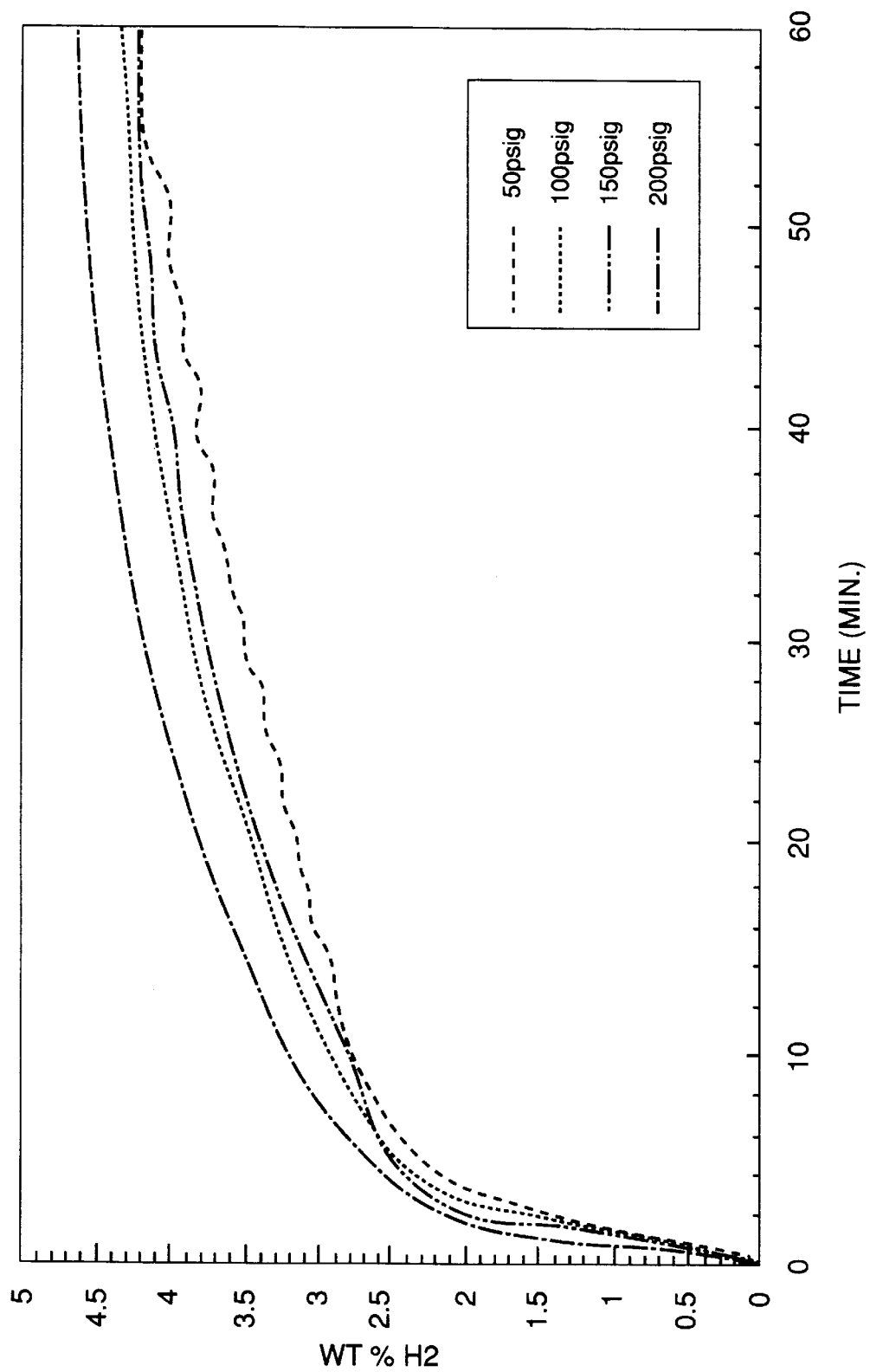
FIG. 4 is a plot of the hydriding kinetics of sample MA-2 at 160° C. at various pressures.
Figure 5:
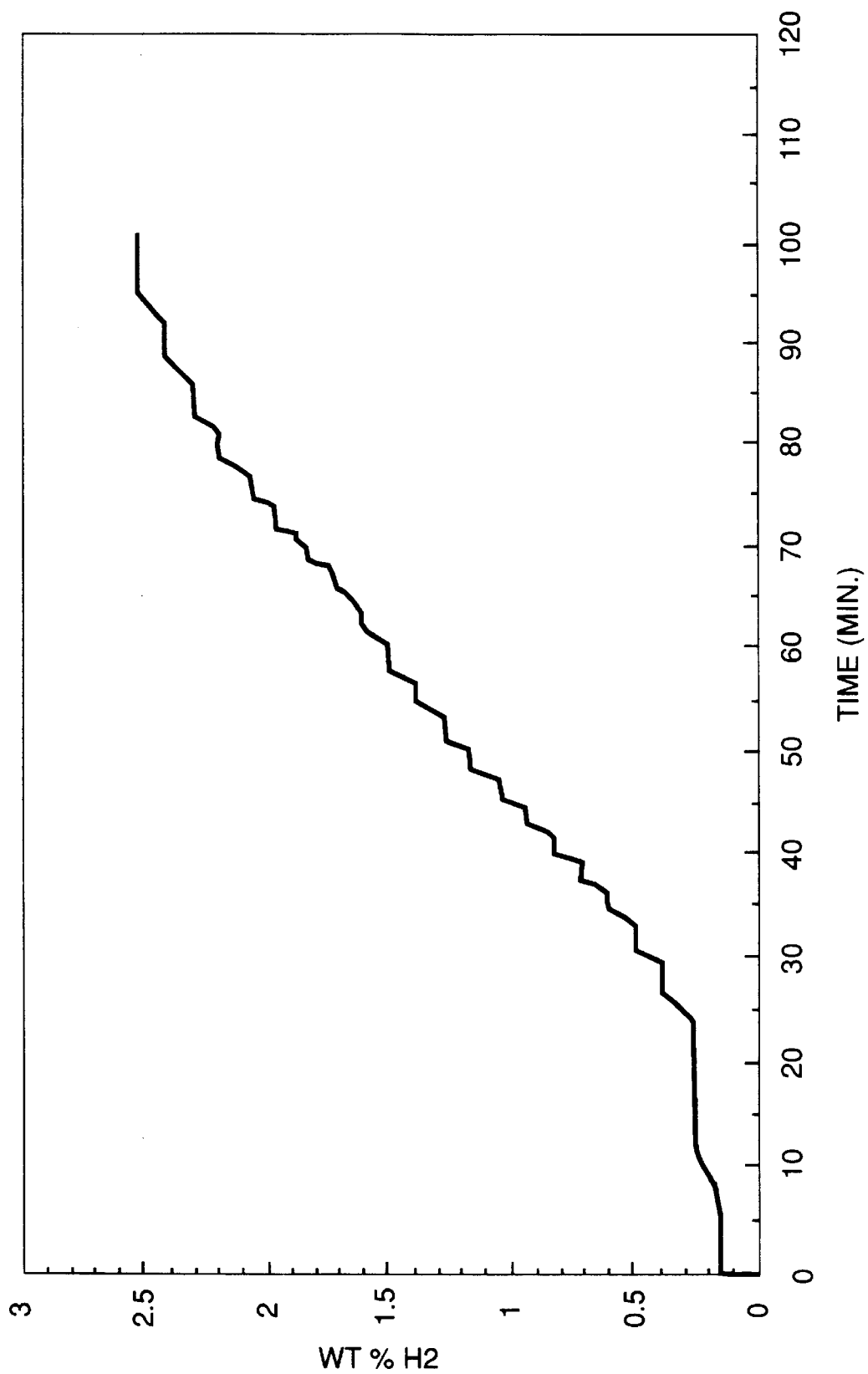
FIG. 5 is a plot of the hydriding kinetics of sample MA-2 at 26° C. at about one atmosphere pressure.
Figure 6:
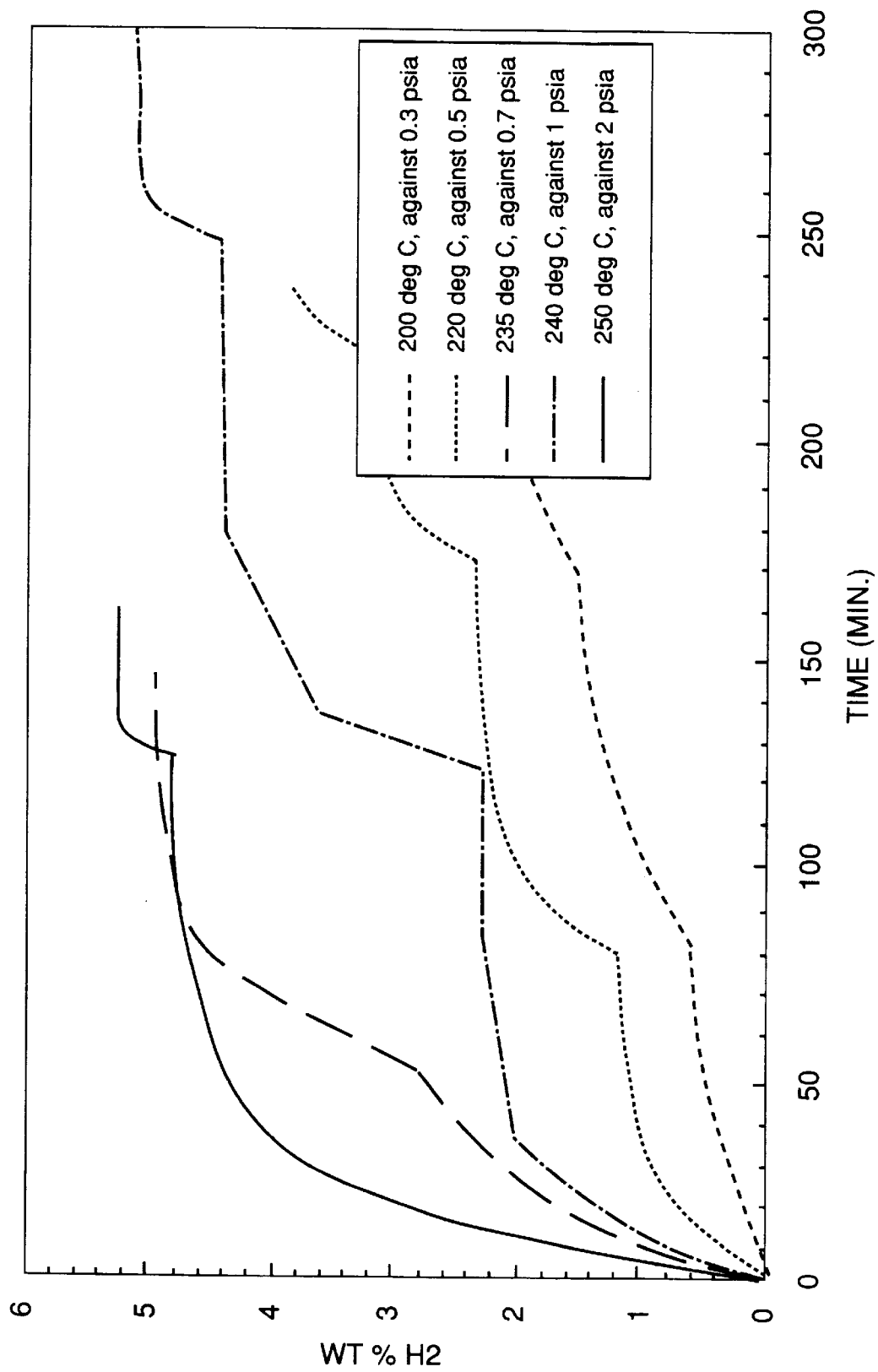
FIG. 6 is a plot of the dehydriding kinetics of sample MA-2 at various temperatures under a vacuum.
Figure 7:
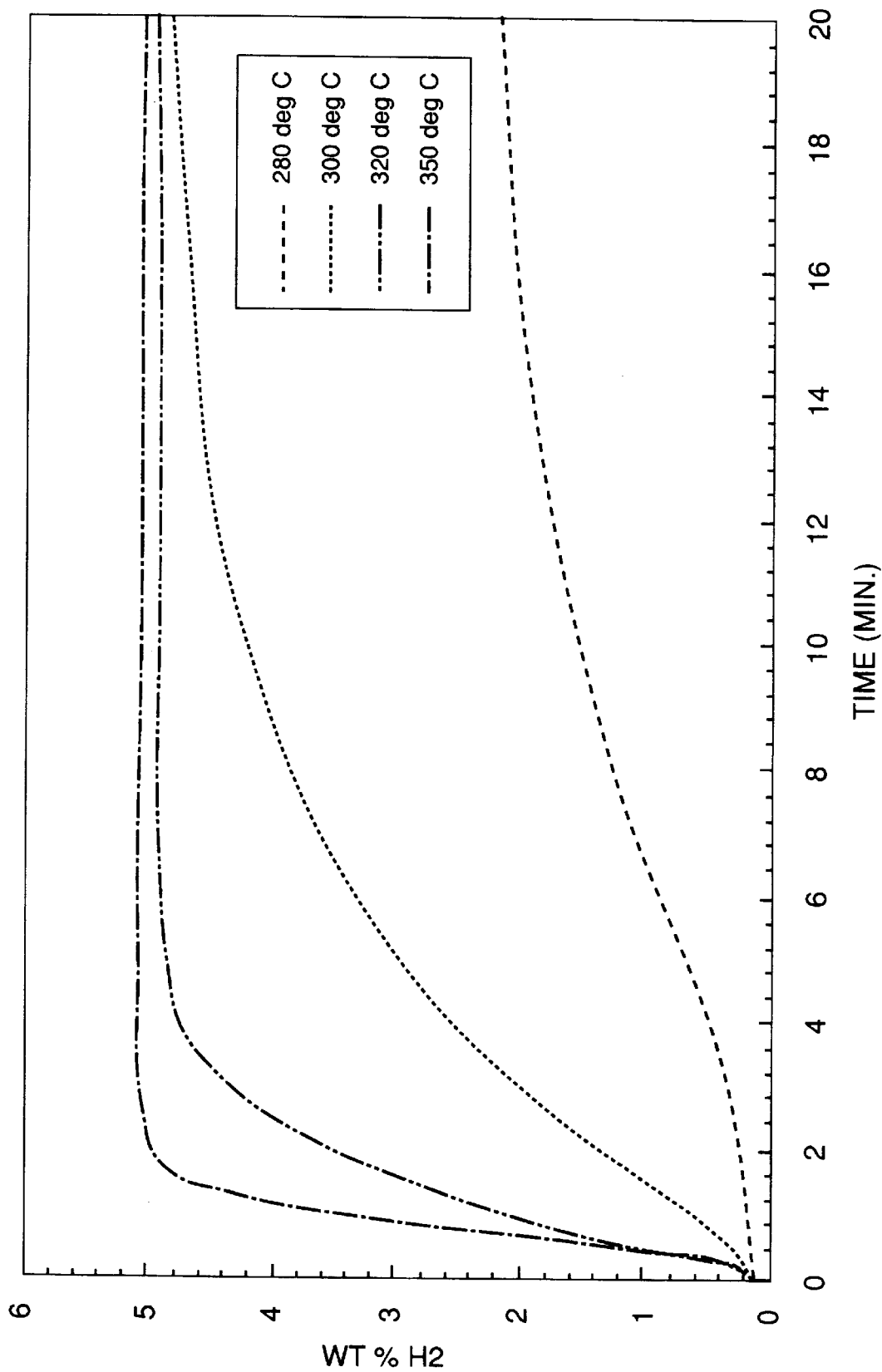
FIG. 7 is a plot of the dehydriding kinetics of sample MA-2 at various temperatures at about one atmosphere pressure.
Figure 8:
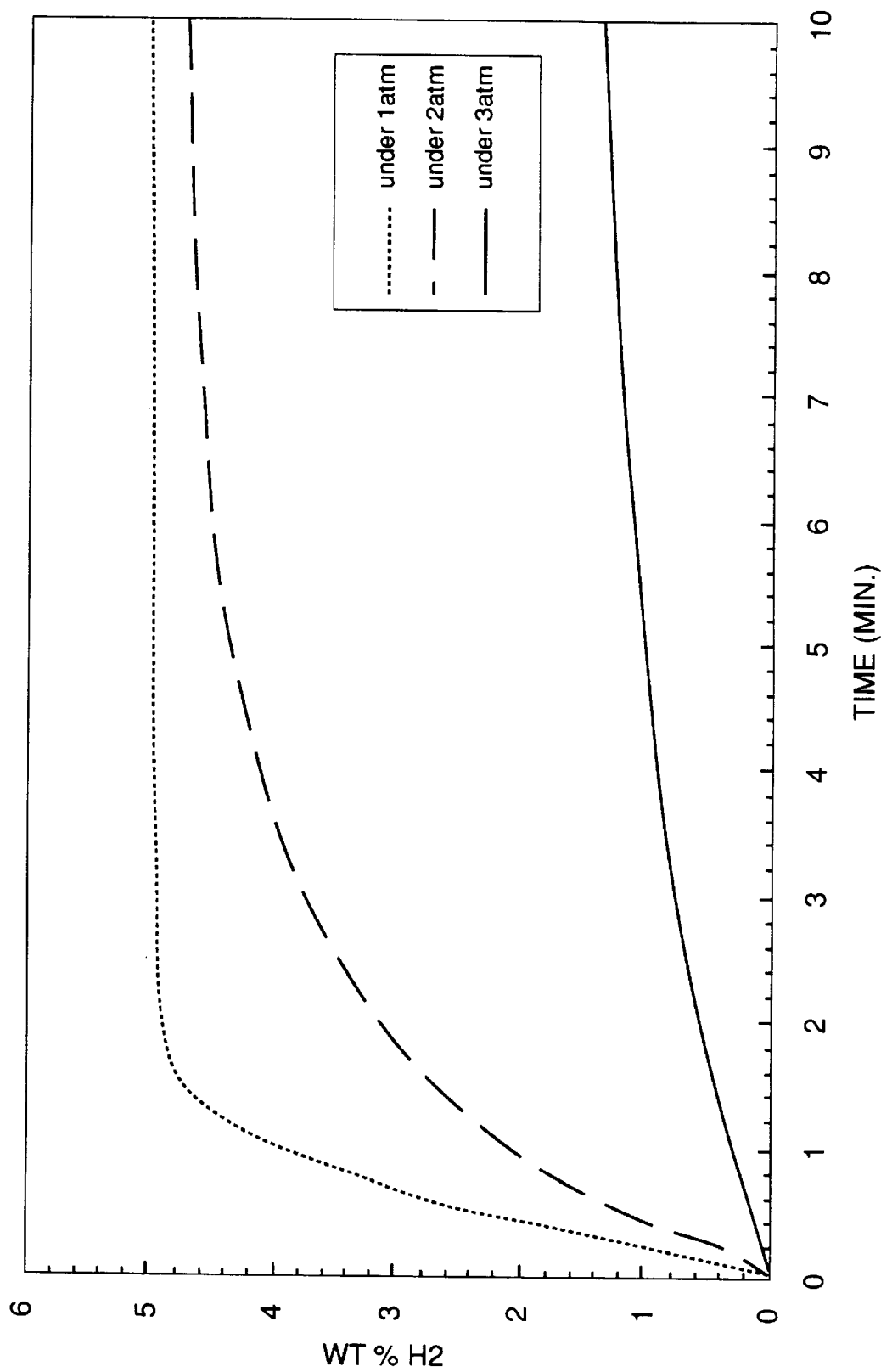
FIG. 8 is a plot of the dehydriding kinetics of sample MA-2 at 350° C. at various pressures.

FIGS. 3–8 are graphical depictions of the hydrogen absorption and desorption kinetics of sample MA-2 measured at various temperatures and pressures. FIG. 3 plots the weight percentage of absorbed hydrogen versus time of sample MA-2 at a hydrogen pressure of 50 psig at various temperature. FIG. 4 shows a similar plot of the H-absorption kinetics of sample MA-2 at 160° C. at different temperatures. FIG. 5 shows that sample MA-2 is capable of absorbing hydrogen even at room temperature. FIG. 6 shows that a maximum hydrogen storage of 5.2 wt. % was obtained for sample MA-2 at 250° C. FIG. 7 shows the dehydriding kinetics of MA-2 determined at various temperatures at a pressure of about one atmosphere. FIG. 8 shows the dehydriding kinetics of MA-2 determined at various pressures at a temperature of 350° C. As can be seen, about 5.0 wt % hydrogen was desorbed at 1 atmosphere at 350° C. in less than 3.0 minutes. The high storage capacity appears to be due to Mg being the predominant hydride former, both Ni and Mo contributing to the improved kinetics of the alloy. While a small amount of Fe was incorporated, unintentionally (from the stainless steel grinding media), into sample MA-2 it does not cause any undesirable effects since Fe is a good catalyst. This alloy system is much superior to either Mg-hydride or $Mg_2Ni$ and its modifications.

Sample MA-6c had a storage capacity of 4.2 wt. %. The XRD pattern for this sample shows highly disordered/amorphous features. Upon sintering at 660° C. for 3 hours the storage capacity dropped to 3.3 wt. % and the corresponding XRD shows the formation of crystalline phases not previously present. While this is a very important result.

Figure 9:
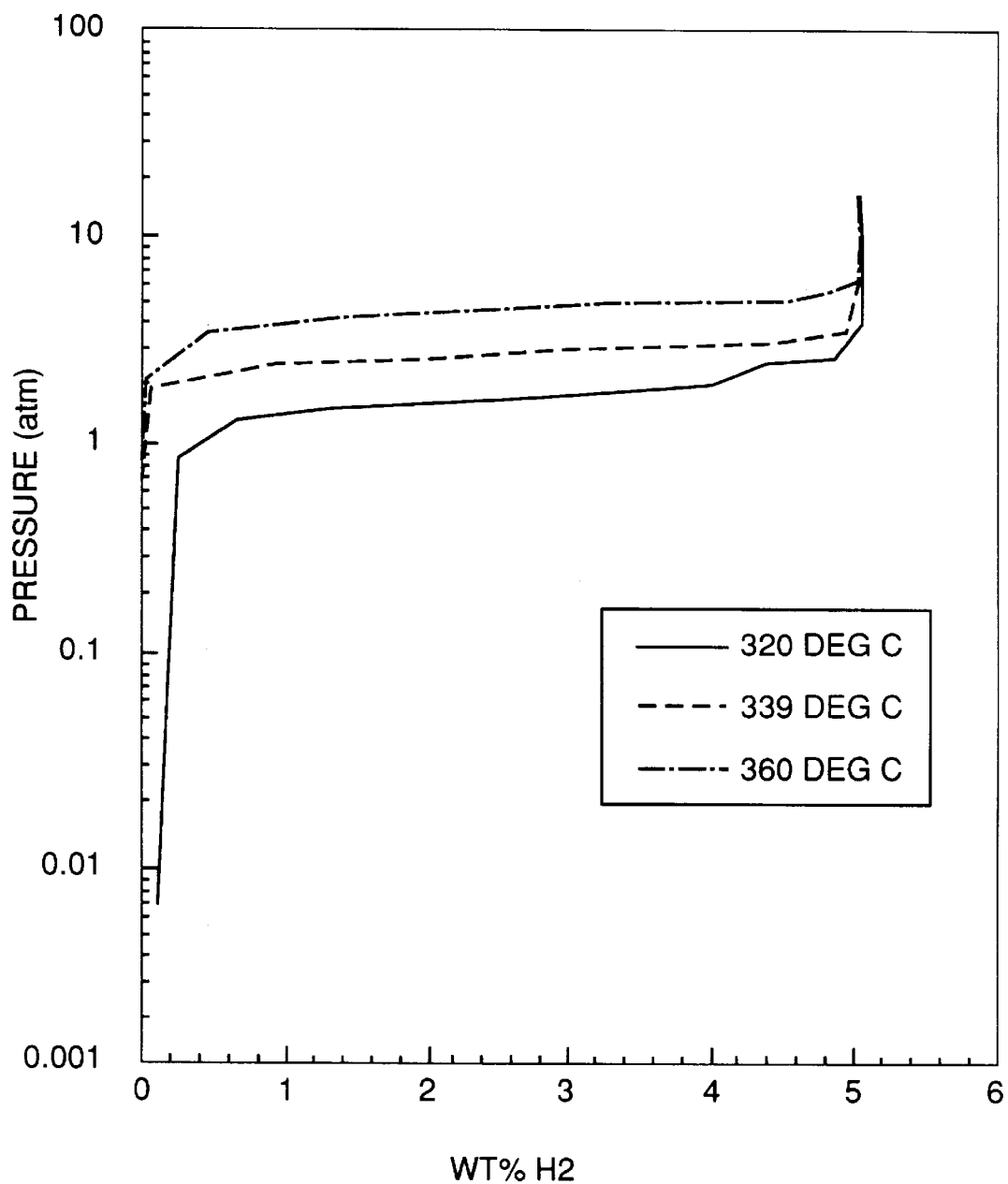
FIG. 9 is a plot of the desorption pressure-composition isotherms of sample MA-2.
Figure 10:
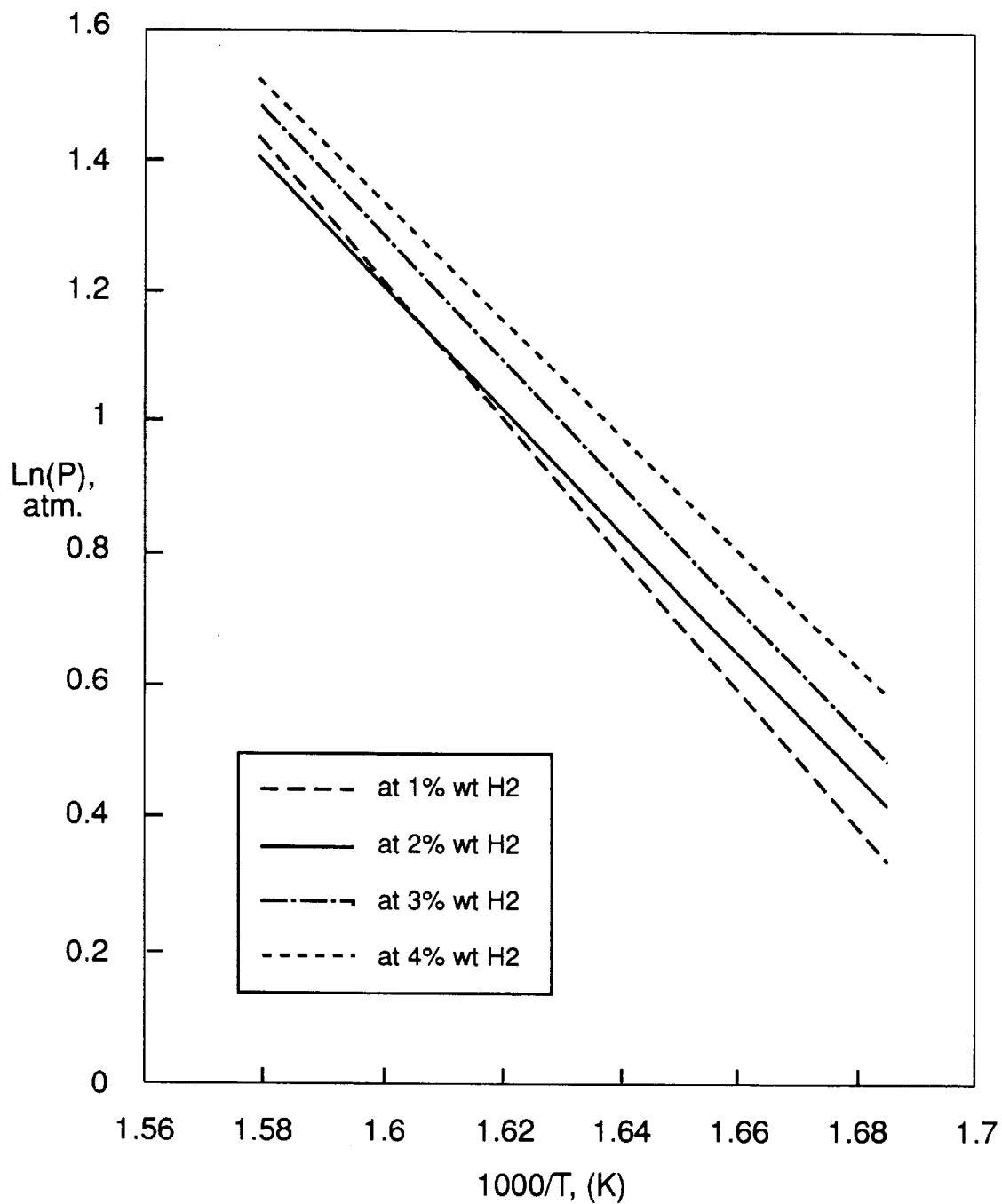
FIG. 10 is a Van't Hoff plot for desorption of sample MA-2.

Sample MA-2 was subjected to further analysis. The desorption P—C isotherms for this alloy are shown in FIG. 9. Based on the plateau pressures at different temperatures and compositions, the thermodynamic properties were calculated, the results of which are shown in Table 2. A van't Hoff plot at different composition is shown in FIG. 10.

Figure 11:
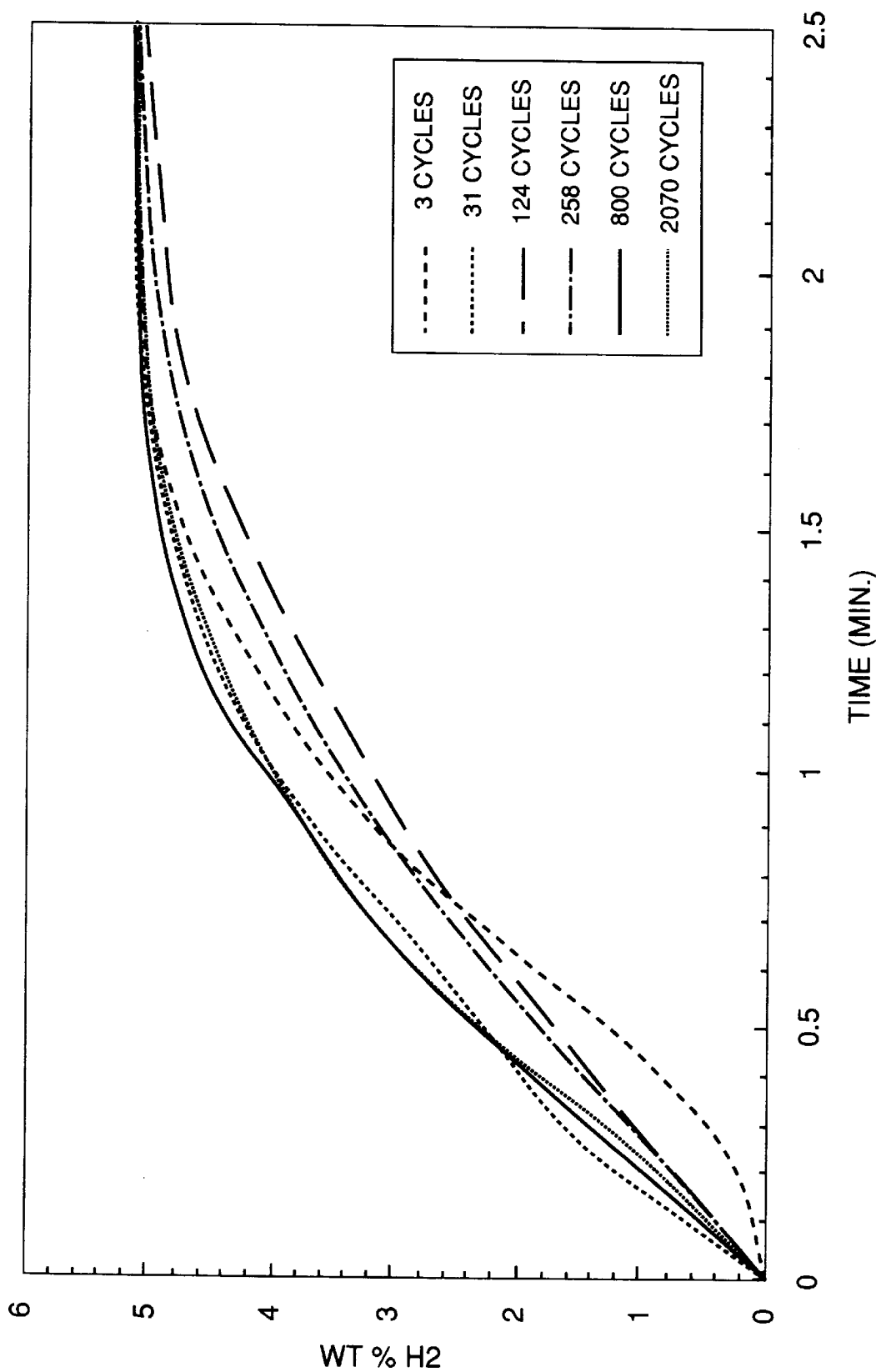
FIG. 11 is a plot of the dehydriding kinetics of sample MA-2 after various numbers of hydriding/dehydriding cycles.
Figure 12:
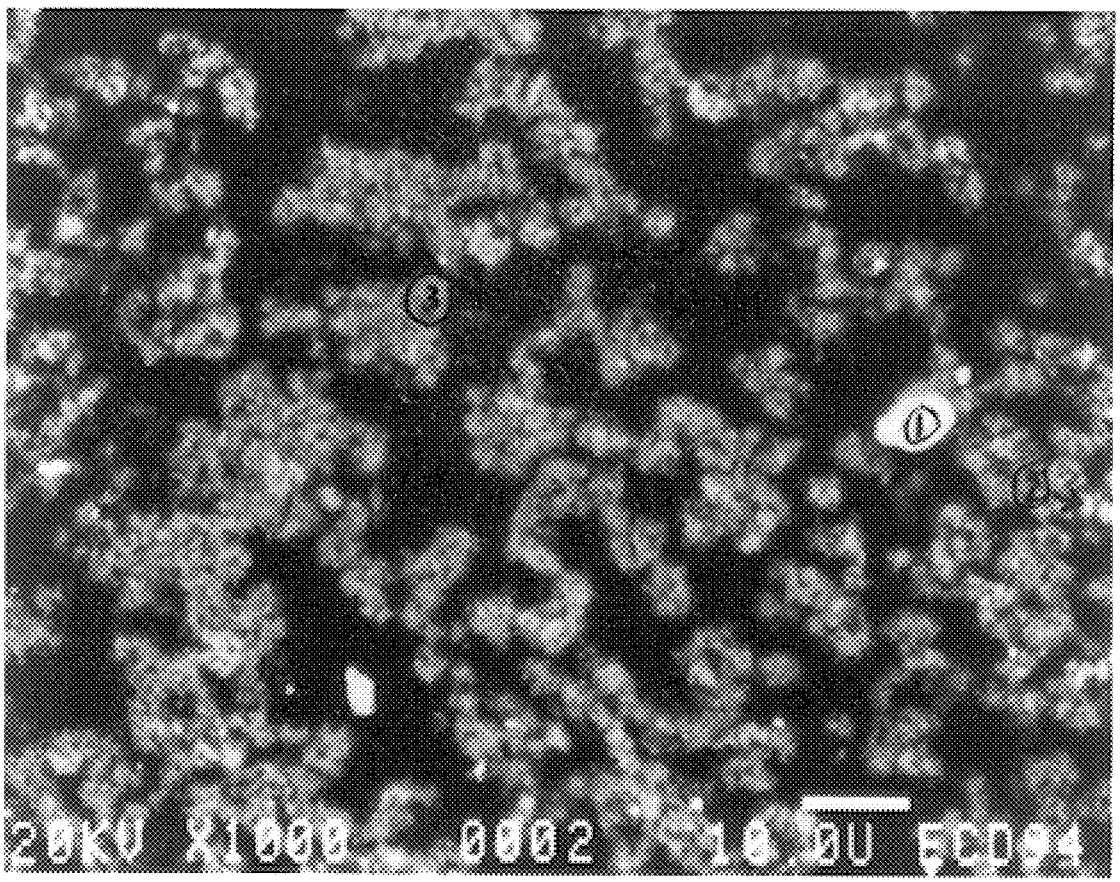
FIG. 12 is an SEM photomicrograph of sample MA-2 after 2017 hydriding/dehydriding cycles.
Figure 13:
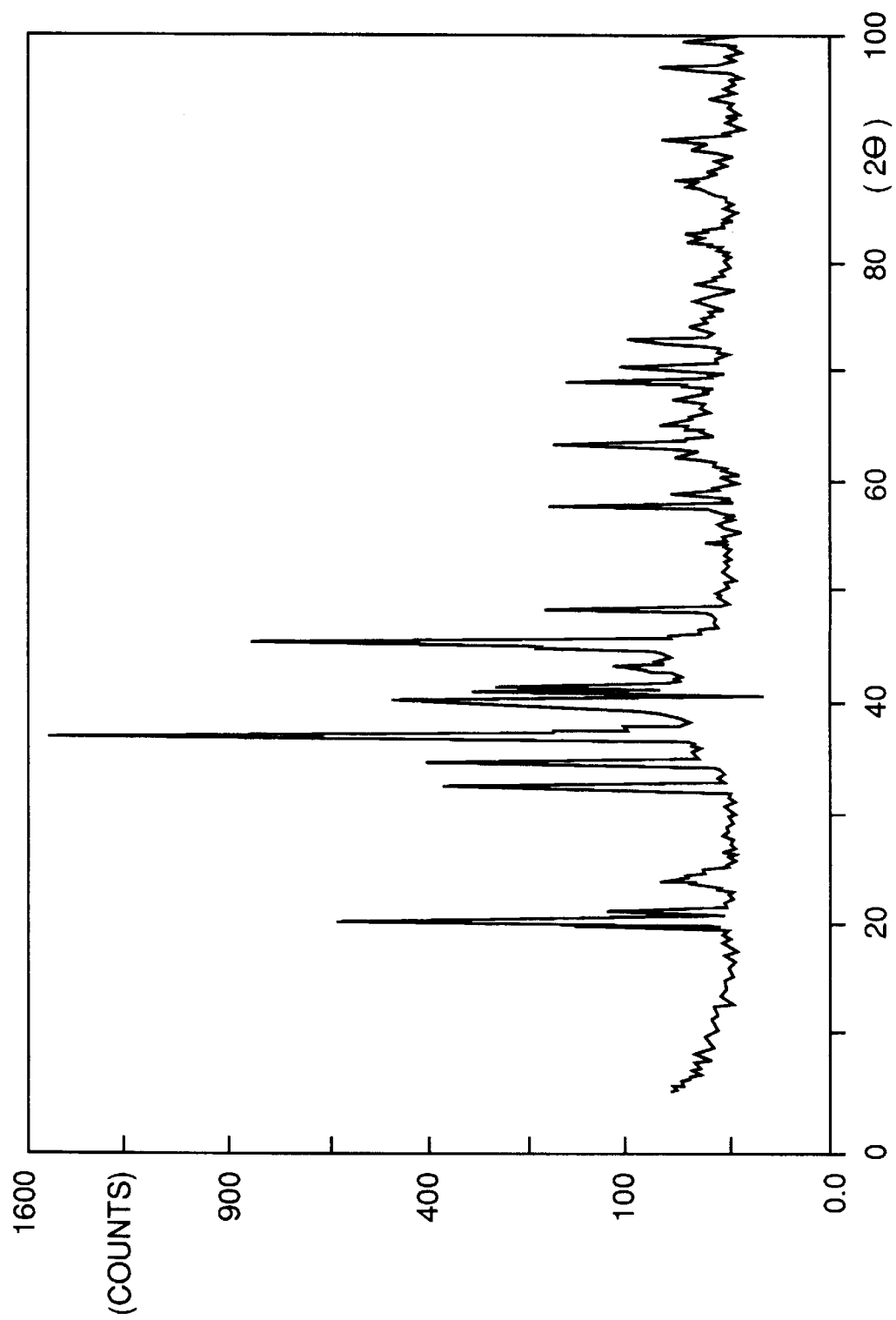
FIG. 13 is an X-ray diffraction pattern of sample MA-2 after 2017 hydriding/dehydriding cycles.

Sample MA-2 has been subjected to more than 2000 hydrogen charge/discharge cycles. The dehydriding kinetics at various stages of cycling are shown in FIG. 11 and in Table 3. For the first few cycles it seems that the sample requires some time for activation before it could desorb hydrogen. After several absorption and desorption cycles, the activation phenomenon ceased and the dehydriding kinetics was thereby improved. Further cycling in very pure hydrogen did not improve the dehydriding kinetics. While there appears to be essentially no loss in the storage capacity with cycling, there seems to be a some improvement in the kinetics. Table 3 gives the time needed for 50% and 90% of the hydrogen to be desorbed at 350° C., and also the wt. % hydrogen released in 3 minutes and 30 minutes. The SEM of MA-2 after 2017 cycles (FIG. 12) shows interesting chain-like structures. FIG. 13 shows the XRD trace of MA-2 after cycling.

Figure 14:
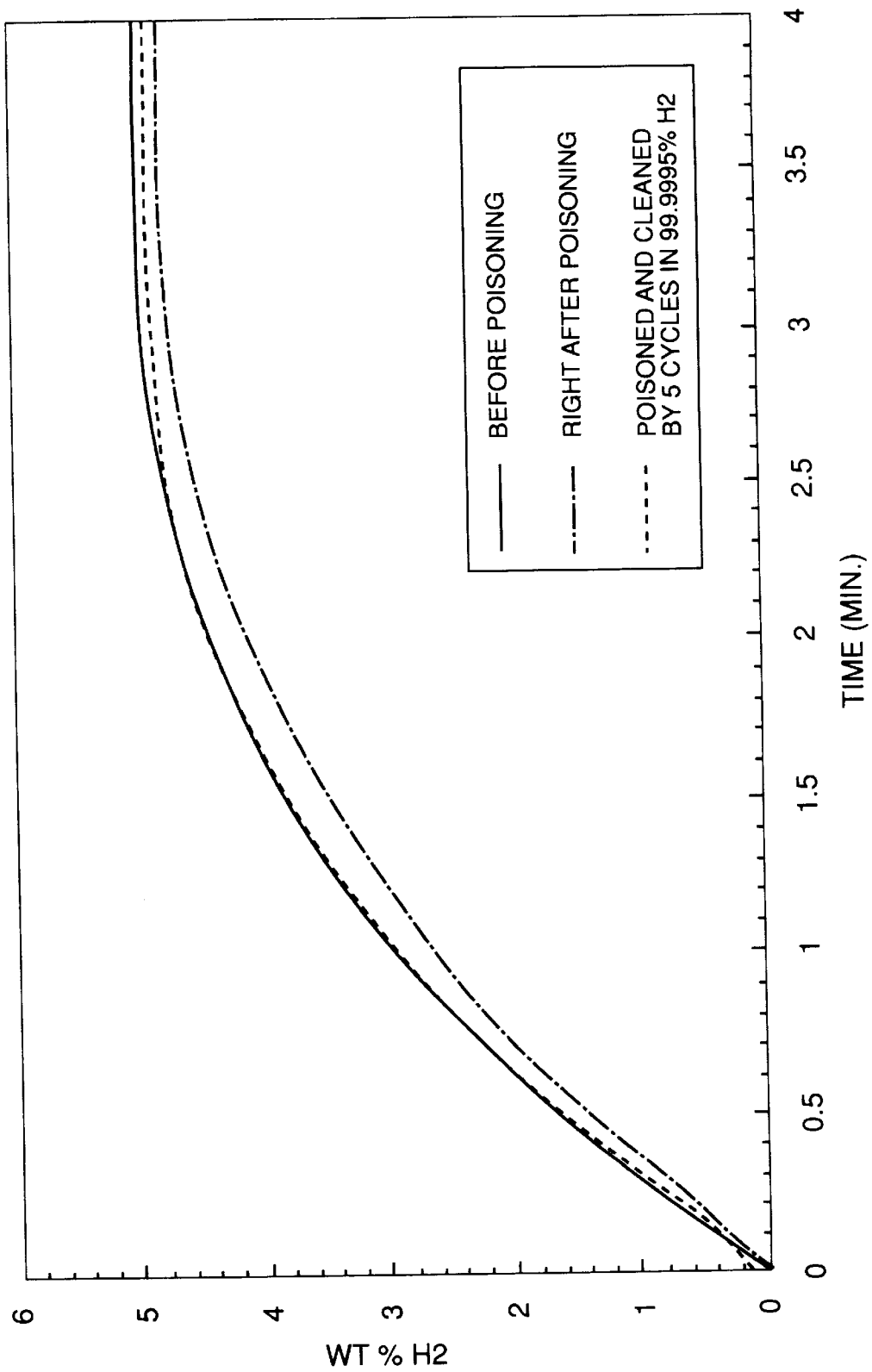
FIG. 14 is a plot of the dehydriding kinetics of sample MA-2, specifically showing the influence of 0.1% CO in $H_2$ poisoning upon the sample and the cleaning effect of ultra-pure hydrogen on the poisoned sample.
Figure 15:
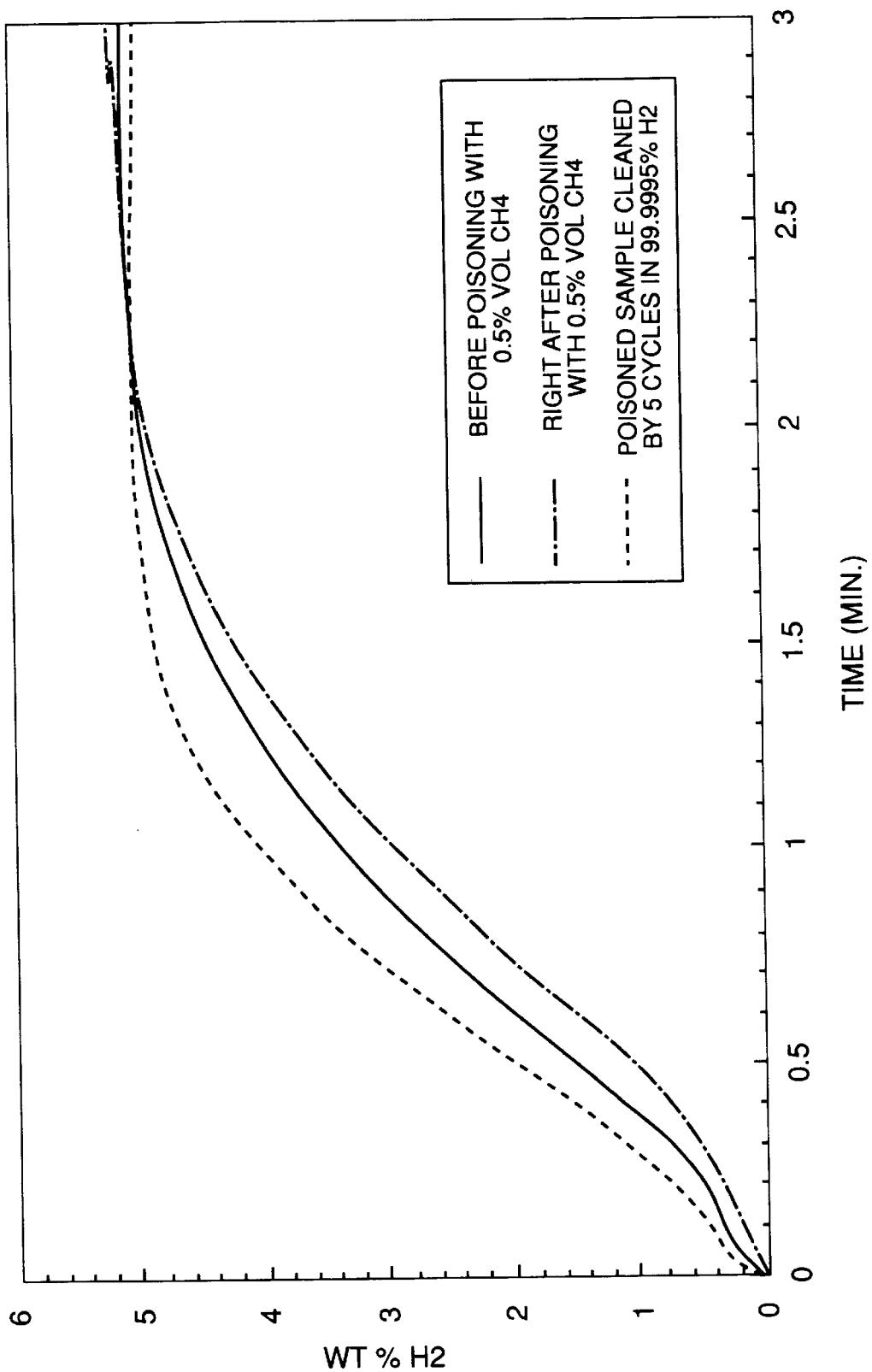
FIG. 15 is a plot of the dehydriding kinetics of sample MA-8a, specifically showing the influence of $CH_4$ in $H_2$ poisoning upon the dehydriding kinetics the of sample and the cleaning effect of ultra-pure hydrogen on the poisoned sample.
Figure 16:
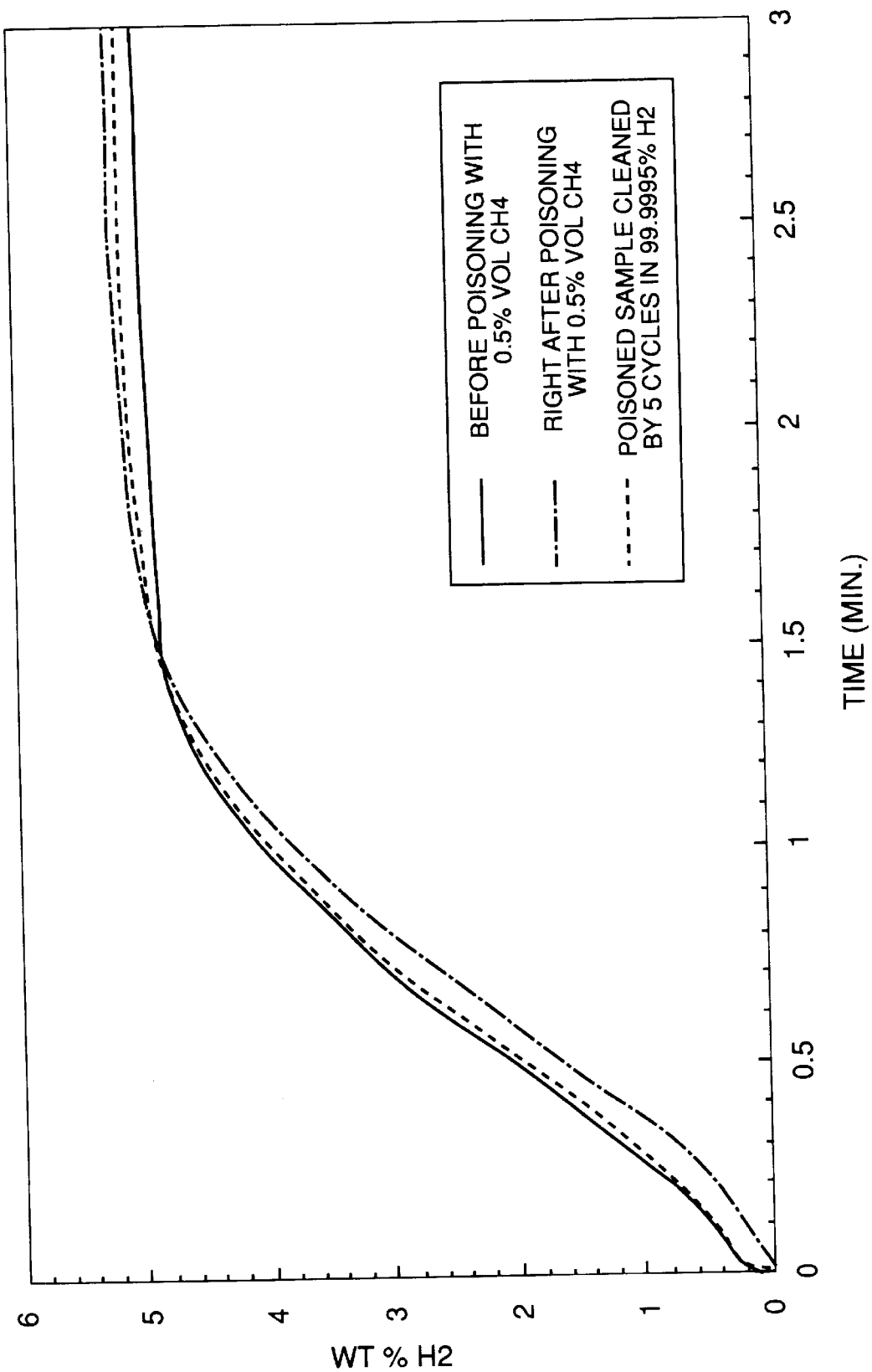
FIG. 16 is a plot of the dehydriding kinetics of sample MA-8a, specifically showing the influence of 0.1% CO in $H_2$ poisoning upon the dehydriding kinetics the of sample and the cleaning effect of ultra-pure hydrogen on the poisoned sample.

In order to determine the effect of poisoning on the storage capacity of the above alloys, sample MA-2 was subjected to a mixtures of methane (0.5% by volume) and hydrogen, and carbon monoxide (0.1% by volume) and hydrogen. The desorption kinetics after subjecting the alloys to these gas mixtures are given in FIGS. 14–16. Specifically, FIG. 14 shows the influence of CO in $H_2$ on the dehydriding kinetics of sample MA-2, FIG. 15 shows the influence of $CH_4$ in $H_2$ on the dehydriding kinetics of sample MA-8a, and FIG. 16 shows the influence of 0.1% CO in $H_2$ on the dehydriding kinetics of sample MA-8a. The curve indicated by the blackened squares shows the dehydriding kinetics prior to poisoning, the curve indicated by the open squares shows the dehydriding kinetics right after poisoning and the curve indicated by the blackened diamonds shows the dehydriding kinetics after the sample is poisoned and cleaned by 5 cycles in 99.9995% $H_2$. As can be clearly seen, these materials are relatively immune to poisoning by these impurity gases at these levels.

Figure 17:
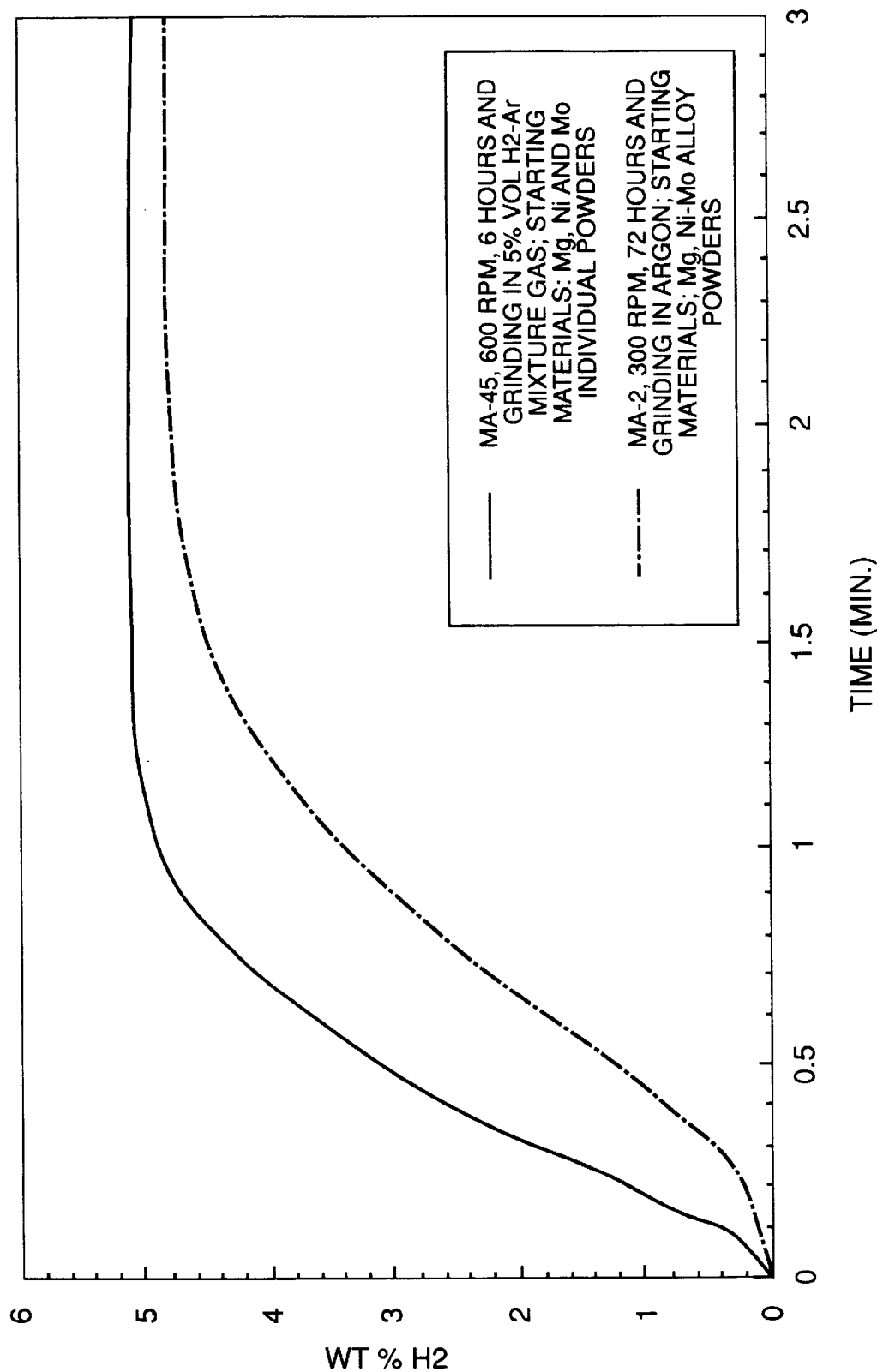
FIG. 17 is a plot comparing of the dehydriding kinetics of a mechanically alloyed hydrogen storage material prepared by mechanical alloying in an attritor at 600 RPM for six hours using elemental powders of Mg, Ni and Mo under a 5 vol. % $H_2$—Ar mixed atmosphere, MA-45, and MA-2 at a temperature of 360° C. and a pressure of about one atmosphere.

It should also be noted that while most of the cited examples involve mechanically alloying Mg with other elements which are pre-alloyed (i.e. Ni—Mo and FeTi), the instant inventors also include within the scope of their invention alloying Mg with elemental powders of the other elements (i.e. Ni and Mo powders or Fe and Ti powders etc.). Also, while the majority of the examples cited above mechanically alloy under an inert atmosphere, a mixture of inert gas and hydrogen or pure hydrogen is included within the scope of the invention. As an example of these modifications, Sample MA-45 was prepared by mechanical alloying in an attritor at 600 RPM for six hours using elemental powders df Mg, Ni and Mo under a 5 vol. % $H_2$—Ar mixed atmosphere. The nominal chemical composition of this sample is nearly identical to that of MA-2. A comparison of the dehydriding kinetics of MA-45 and MA-2 at a temperature of 360° C. and a pressure of about one atmosphere are shown in FIG. 17. As can be seen, the mechanically alloyed sample made from pure elemental powders under a $H_2$—Ar atmosphere (i.e. MA-45) has both better kinetics and a higher capacity that made from Mg and a Ni—Mo alloy under an Argon atmosphere ( i.e. MA-2).

Finally, while the instant invention has been described in the context of thermal hydrogen storage, these materials or modifications thereof may find many other applications, such as electrochemical hydrogen storage, heat pump use, or as a fuel cell storage material. Therefore, while the invention has been described in connection with preferred embodiments and procedures, it is to be understood that it is not intended to limit the invention to the described embodiments and procedures. On the contrary it is intended to cover all alternatives, modifications and equivalence which may be included within the spirit and scope of the invention as defined by the claims appended hereinafter.

TABLE 1

| Sample # | Nominal Composition Atomic Percent | Wt. Ratio Mg:Ni—Mo Mg:Fe—Ti | Mech. Alloying Parameters RPM | Mech. Alloying Parameters (hr) | Hydrogen Storage Cap. Wt. % |
|---|---|---|---|---|---|
| MA-2 | $Mg_{85.6}Ni_{13.2}Mo_{1.2}$ | 7:3 | 300 | 72 | 5.2 |
| MA-3 | $Mg_{91}Ni_{8.3}Mo_{0.7}$ | 4:1 | 400 | 42 | 2.96 |
| MA-4 | $Mg_{91}Ni_{8.3}Mo_{0.7}$ | 4:1 | 300 | 72 | 4.1 |
| MA-5 | $Mg_{91}Ni_{8.3}Mo_{0.7}$ | 4:1 | 300 | 110 | 4.1 |
| MA-6a | $Mg_{91}Ni_{8.3}Mo_{0.7}$ | 4:1 | 600 | 24 | 3.6 |
| MA-6b | $Mg_{91}Ni_{8.3}Mo_{0.7}$ | 4:1 | 600 | 48 | 3.9 |
| MA-6c | $Mg_{91}Ni_{8.3}Mo_{0.7}$ | 4:1 | 600 | 72 | 4.2 |
| MA-6c sintered | $Mg_{91}Ni_{8.3}Mo_{0.7}$ | 4:1 | Sintered 660° C. for 3 hours | | 3.3 |
| MA-8a | $Mg_{76}Fe_{12}Ti_{12}$ | 3:2 | 300 | 64 | 5.0 |
| MA-8a sintered | $Mg_{76}Fe_{12}Ti_{12}$ | 3:2 | Sintered 660° C. for 3 hours | | 3.6 |
| MA-9 | $Mg_{76}Fe_{12}Ti_{12}$ | 3:2 | 200 | 16 | 3.2 |
| MA-10 | $Mg_{76}Fe_{12}Ti_{12}$ | 3:2 | 600 | 86 | 3.5 |
| MA-11a | $Mg_{76}Fe_{12}Ti_{12}$ | 3:2 | 600 | 86 | 3.8 |
| MA-11b | $Mg_{76}Fe_{12}Ti_{12}$ | 3:2 | 300 | 64 | — |
| MA-12 | $Mg_{90}Fe_5Ti_5$ | 4:1 | 300 | 72 | 4.0 |
| MA-13 | $Mg_{90}Fe_5Ti_5$ | 4:1 | 600 | 72 | 4.25 |
| MA-14 | $Mg_{85.6}Ni_{13.2}Mo_{1.2}$ | 7:3 | 150 | 3 | 1.2 (granules) |
| MA-15 | $Mg_{85.6}Ni_{13.2}Mo_{1.2}$ | 7:3 | 300 | 3 | 1.01 (granules) |
| MA-16 | $Mg_{85.6}Ni_{13.2}Mo_{1.2}$ | 7:3 | 600 | 3 | 4.25 (flakes) |
| MA-17 | $Mg_{85.6}Ni_{13.2}Mo_{1.2}$ | 7:3 | 300 | 6 | 2.25 (granules) |
| MA-18 | $Mg_{85.6}Ni_{13.2}Mo_{1.2}$ | 7:3 | 600 | 6 | 4.4 (powder) 2.1 (granules) |
| MA-19 | $Mg_{85.6}Ni_{13.2}Mo_{1.2}$ | 7:3 | 600 | 9 | 4.5 (powder) |
| MA-20 | $Mg_{85.6}Ni_{13.2}Mo_{1.2}$ | 7:3 | 600 | 18 | 4.5 |
| MA-21 | $Mg_{85.6}Ni_{13.2}Mo_{1.2}$ | 7:3 | 300 | 9 | 1.84 |
| MA-22 | $Mg_{85.6}Ni_{13.2}Mo_{1.2}$ | 7:3 | 300 | 72 | 2.9 |
| MA-23 | $Mg_{85.6}Ni_{13.2}Mo_{1.2}$ | 7:3 | 300 | 18 | 0.95 |
| MA-24 | $Mg_{85.6}Ni_{13.2}Mo_{1.2}$ | 7:3 | 600 | 72 | 2.8 |
| MA-25 | $Mg_{85.6}Ni_{13.2}Mo_{1.2}$ | 7:3 | 300 | 72 | 3.7 |
| MA-26 | $Mg_{71.2}Ni_{26.4}Mo_{2.4}$ | 1:1 | 600 | 18 | 2.6 |
| MA-38 | $Mg_{91}Ni_{8.3}Mo_{0.7}$ | 4:1 | 700 | 6 | 5.5 |
| MA-45 | $Mg_{86}Ni_{13}Mo_1$ | N/A | 700 | 6 | 5.5 |

TABLE 2

| Amount of $H_2$ in the alloy (wt %) | Enthalpy change, $\Delta H$, kCal/mol $H_2$ | Entropy change, $\Delta S$, Cal/mol $H_2K$ | $R^2$ from regression analysis | Plateau pressure at 320° C. (atm) |
|---|---|---|---|---|
| 1.0 | 20.55 | 35.29 | 0.9999 | 1.40 |
| 2.0 | 18.59 | 32.18 | 0.9999 | 1.51 |
| 3.0 | 18.66 | 32.44 | 0.9989 | 1.62 |
| 4.0 | 17.56 | 30.74 | 0.9998 | 1.79 |
| Average | 18.85 | 32.62 | 0.9997 | 1.58 |

TABLE 3

| Cycle No. | *$t_{50}$ (min) | *$t_{90}$ (min) | Wt %, $H_2$ Released in 3 min. | Wt %, $H_2$ Released in 30 min. |
|---|---|---|---|---|
| 3 | 0.7 | 1.4 | 5.1 | 5.2 |
| 31 | 0.57 | 1.28 | 5.1 | 5.2 |
| 124 | 0.8 | 1.8 | 5.0 | 5.2 |
| 258 | 0.75 | 1.75 | 5.1 | 5.3 |
| 800 | 0.6 | 1.32 | 5.1 | >5.1 |
| 2070 | 0.58 | 1.44 | 5.1 | 5.3 |

*$t_{50}$ and $t_{90}$ are time needed for releasing 50% and 90% of stored hydrogen in hydride.

We claim:

1. A hydrogen storage material consisting essentially of a mechanical alloy of from 75 to 95 atomic percent magnesium and the remainder consisting essentially of iron and titanium,
    said hydrogen storage material having been made by mechanical alloying.

2. The hydrogen storage material of claim 1, wherein said mechanical alloy comprises a multi-phase material.

3. The hydrogen storage material of claim 2, wherein said iron comprises from 5 to 15 at. % of the mechanical alloy.

4. The hydrogen storage material of claim 2, wherein said titanium comprises from 5 to 15 at. % of the mechanical alloy.

5. The hydrogen storage material of claim 1, wherein said mechanical alloy includes at least one amorphous phase.

6. The hydrogen storage material of claim 5, wherein said iron comprises from 5 to 15 at. % of the mechanical alloy.

7. The hydrogen storage material of claim 5, wherein said titanium comprises from 5 to 15 at. % of the mechanical alloy.

8. The hydrogen storage material of claim 1, wherein said iron comprises from 5 to 15 at. % of the mechanical alloy.

9. The hydrogen storage material of claim 1, wherein said titanium comprises from 5 to 15 at. % of the mechanical alloy.

* * * * *